United States Patent
Tamura et al.

(10) Patent No.: US 9,612,065 B2
(45) Date of Patent: Apr. 4, 2017

(54) HEAT CONDUCTIVE SHEET

(75) Inventors: Kentaro Tamura, Kanagawa Pref. (JP); Masaki Oota, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 570 days.

(21) Appl. No.: 14/114,839

(22) PCT Filed: Apr. 26, 2012

(86) PCT No.: PCT/US2012/035133
§ 371 (c)(1),
(2), (4) Date: Mar. 7, 2014

(87) PCT Pub. No.: WO2012/151101
PCT Pub. Date: Nov. 8, 2012

(65) Prior Publication Data
US 2014/0166258 A1    Jun. 19, 2014

(30) Foreign Application Priority Data
May 2, 2011    (JP) ................................. 2011-103078

(51) Int. Cl.
| *F28F 21/06* | (2006.01) |
| *C08K 5/12* | (2006.01) |
| *C08K 5/13* | (2006.01) |
| *C08K 5/372* | (2006.01) |
| *C08J 5/18* | (2006.01) |

(52) U.S. Cl.
CPC ................ *F28F 21/06* (2013.01); *C08J 5/18* (2013.01); *C08K 5/12* (2013.01); *C08K 5/13* (2013.01); *C08K 5/372* (2013.01)

(58) Field of Classification Search
None
See application file for complete search history.

(56) References Cited

U.S. PATENT DOCUMENTS

| 6,207,272 | B1 | 3/2001 | Takahira |
| 6,211,276 | B1 | 4/2001 | Miyahara |
| 7,589,147 | B2 | 9/2009 | Kawata |
| 7,956,116 | B2 | 6/2011 | Yoda |
| 2003/0097963 | A1* | 5/2003 | Schunk ............ C08K 5/13 106/170.11 |
| 2006/0063017 | A1 | 3/2006 | Funahashi |
| 2008/0039575 | A1 | 2/2008 | Mercx |
| 2010/0000653 | A1 | 1/2010 | Krawinkel |
| 2010/0020496 | A1* | 1/2010 | Yoda ............... C08K 3/22 361/704 |

FOREIGN PATENT DOCUMENTS

| JP | H11-292998 | 10/1999 |
| JP | 2001-0310984 | 11/2001 |
| JP | 2003-0238760 | 8/2003 |
| JP | 2004-300300 | 10/2004 |
| JP | 4386269 | 12/2005 |
| JP | 2006-096982 | 4/2006 |
| JP | 2007-246664 | 9/2007 |
| JP | 2008-163126 | 7/2008 |
| JP | 2010-111757 | 5/2010 |
| JP | 4614593 | 1/2011 |
| WO | WO 2006-062614 | 6/2006 |

OTHER PUBLICATIONS

International Search Report for PCT International No. PCT/US2012/035133, Mailed on Nov. 23, 2012, 3 pages.

* cited by examiner

*Primary Examiner* — Sheeba Ahmed

(57) ABSTRACT

The present invention provides a heat conductive sheet that can maintain high heat conductivity and flexibility across a long period of time even in high temperature environments. The heat conductive sheet includes a (meth)acrylate polymer, a trimellitate ester plasticizer, a first antioxidant with a hindered phenol backbone, and a second antioxidant with a thioether backbone.

6 Claims, 1 Drawing Sheet

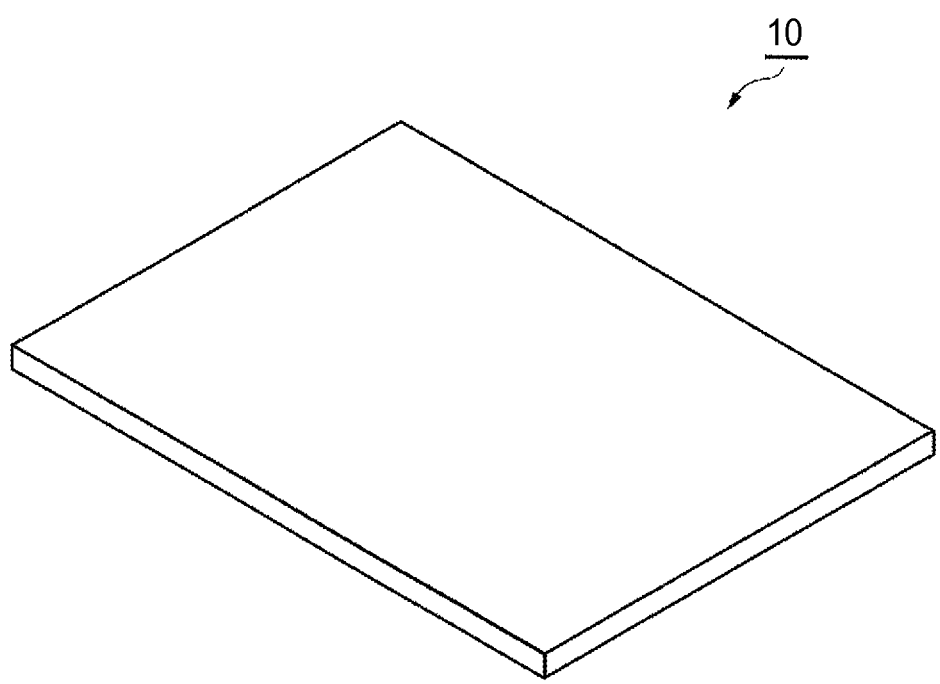

HEAT CONDUCTIVE SHEET

CROSS REFERENCE TO RELATED APPLICATIONS

This application is a national stage filing under 35 U.S.C. 371 of PCT/US2012/035133, filed Apr. 26, 2012, which claims priority to Japanese Patent Application No. 2011-103078, filed May 2, 2011, the disclosure of which is incorporated by reference in its/their entirety herein.

TECHNICAL FIELD

The present invention relates generally to a heat conductive sheet.

BACKGROUND

Conventionally, a method of joining heating elements and heat sinks with a heat conductive sheet is known as a method for cooling heating elements such as semiconductor elements installed in electronic devices. For example, Japanese Unexamined Patent Application Publication No. 2001-310984 discloses a heat conductive molded body molded from a heat conductive elastomer composition containing specific amounts of thermoplastic elastomer, magnesium oxide, and soft magnetic material powder, and proposes providing this molded body between parts to be cooled and a heat sink.

Furthermore, Japanese Unexamined Patent Application Publication No. 2003-238760 discloses "a non-halogen flame retardant heat dispersing sheet, comprising 100 to 150 weight parts of a metal hydroxide based flame retardant, 1 to 10 weight parts of red phosphorus, and 500 to 700 weight parts of heat conductive powder in 100 weight parts of binder resin comprising 60 to 90 weight % of ethylene acrylate polymer and 10 to 40 weight % of ethylene-methyl acrylate copolymer" as a heat dissipating sheet with excellent flame retardancy.

However, in recent years, the heat generating density of heating element surroundings have further increased because of higher integration and reduced size of electronic devices, and the thermal properties required of conventional heat conductive sheets do not necessarily provide sufficient effects. In particular, issues that were not required of conventional heat conductive sheets include long term stability when used at the high temperatures generated in recent electronic devices.

SUMMARY

The heat conductive sheet according to an aspect of the present invention contains a (meth)acrylate polymer, a trimellitate ester plasticizer, a first antioxidant with a hindered phenol backbone, and a second antioxidant with a thioether backbone.

This heat conductive sheet demonstrates the excellent effect of maintaining high heat conductivity and flexibility for a long period of time in high temperature environments because of a combination of the trimellitate ester plasticizer and the second antioxidant.

Furthermore, in another aspect of the present invention, the heat conductive sheet can be a heat conductive sheet made by polymerizing a resin composition containing a (meth)acrylate monomer, a polymerization initiator, a trimellitate ester plasticizer, a first antioxidant with a hindered phenol backbone, a second antioxidant with a thioether backbone, and a heat conductive filler.

Furthermore, with the heat conductive sheet according to another aspect of the present invention, the trimellitate ester plasticizer can be a compound expressed by the following formula (1).

Formula 1

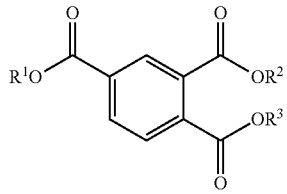

(1)

(In the formula, $R^1$, $R^2$, and $R^3$ individually represent alkyl groups with 1 to 24 carbon atoms.)

Furthermore, with the heat conductive sheet according to another aspect of the present invention, the second antioxidant can be a compound expressed by the following formula (2).

Formula 2

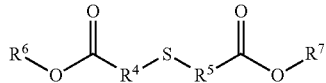

(2)

(In the formula, $R^4$ and $R^5$ individually represent alkandiyl groups with 1 to 8 carbon atoms, and $R^6$ and $R^7$ individually represent alkyl groups with 2 to 40 carbon atoms.)

Furthermore, an amount of the second antioxidant in the heat conductive sheet according to another aspect is from about 0.1 to about 10 mass parts for a total of 100 mass parts of trimellitate ester plasticizer.

Furthermore, an amount of the first antioxidant in the heat conductive sheet according to another aspect is from about 0.1 to about 10 mass parts for a total of 100 mass parts of trimellitate ester plasticizer.

The present invention provides a heat conductive sheet that can maintain high heat conductivity and flexibility over a long period of time even in high temperature environments.

BRIEF DESCRIPTION OF THE DRAWINGS

FIG. 1 is a perspective view illustrating an embodiment of a heat conductive sheet of the present invention.

DETAILED DESCRIPTION

An embodiment of the present invention is described below in detail while referring to the drawings. Note, the term "(meth)acrylate" in this specification refers to "acrylate and/or methacrylate". In other words, the term "(meth)acrylate" refers to at least one type selected from acrylate and methacrylate.

FIG. 1 is a perspective view illustrating an embodiment of a heat conductive sheet of the present invention. The heat conductive sheet 10 contains a (meth)acrylate polymer, a trimellitate ester plasticizer, a first antioxidant with a hindered phenol backbone, and a second antioxidant with a thioether backbone.

The heat conductive sheet 10 maintains high heat conductivity and flexibility for a long period of time in high temperature environments because of a combination of the trimellitate ester plasticizer and the second antioxidant.

Conventionally, when a heat conductive sheet is stored for a long period of time in a high temperature environment, flexibility is lost, adhesion toward heating elements and heat sinks deteriorates, and sufficient heat conductivity may not be achieved. However, the present inventors discovered that one cause is vaporization of the plasticizer included in the heat conductive sheet due to exposure to high temperatures that were not anticipated with conventional heat conductive sheets, leading to a loss of flexibility. Furthermore, the present inventors discovered that bleedout of antioxidant will occur when a conventional heat conductive sheet is used for a long period of time in high temperature environments, and thereby heat resistance of the heat conductive sheet is reduced. Furthermore, heat conductivity and flexibility may also be reduced.

Furthermore, with the heat conductive sheet 10, vaporization of the plasticizer and bleedout of the antioxidant can be sufficiently suppressed even when used for a long period of time in a high temperature environment, by combining the aforementioned trimellitate ester plasticizer and the aforementioned second antioxidant. Therefore, the heat conductive sheet 10 maintains high heat conductivity and flexibility over a long period of time, even in high temperature environments.

Each component included in the heat conductive sheet 10 is described below.

(Meth)Acrylate Polymer

The (meth)acrylate polymer is a polymer obtained by polymerizing a monomer component containing (meth)acrylate monomer. Herein, "(meth)acrylate monomer" indicates acrylate monomers such as acrylic acid, acrylate esters and the like, and/or methacrylate monomers such as methacrylic acid, methacrylate esters, and the like. In other words, the (meth)acrylate polymer can be a polymer obtained by polymerizing a monomer component containing at least one type of monomer selected from the group consisting of acrylate monomers and methacrylate monomers.

The (meth)acrylate monomer is not particularly restricted, and can be any monomer that is used for forming a standard (meth)acrylate polymer. Furthermore, the (meth)acrylate monomer can be a single type, or two or more types can be used in combination.

In one embodiment, the monomer component contains a (meth)acrylate monomer that is at least monofunctional as the (meth)acrylate monomer. A monofunctional (meth)acrylate monomer refers to a monomer with one (meth)acryloyl group.

Examples of monofunctional (meth)acrylate monomers include, but are not limited to: (meth)acrylic acid, alkyl (meth)acrylate, aryl(meth)acrylate, (meth)acrylamide, epoxy acrylate, urethane acrylate, and the like.

Of these, in one embodiment the monofunctional (meth)acrylate monomer is an alkyl (meth)acrylate having an alkyl group with 12 to 20 carbon atoms. By using this type of monofunctional (meth)acrylate monomer, the (meth)acrylate polymer can have excellent compatibility with the trimellitate ester plasticizer. The alkyl group can be straight chained, branched, or cyclic.

Furthermore, in one embodiment, the monofunctional (meth)acrylate monomer is two or more different types of alkyl(meth)acrylate with different numbers of carbon atoms. In this case, a flexibility of the heat conductive sheet 10 obtained can be appropriately adjusted depending on the application by adjusting an amount of each of the alkyl (meth)acrylates.

The monomer component can also contain polyfunctional (meth)acrylate monomers as the (meth)acrylate monomer. A polyfunctional (meth)acrylate monomer is a monomer with two or more (meth)acryloyl groups. If the monomer component contains a polyfunctional (meth)acrylate monomer, the (meth)acrylate polymer will have a cross-linked structure, and therefore a strength of the heat conductive sheet 10 will be enhanced.

Examples of polyfunctional (meth)acrylate monomers include, but are not limited to: difunctional (meth)acrylate monomers such as 1,6-hexanediol di(meth)acrylate, 1,4-butanediol di(meth)acrylate, ethylene glycol di(meth)acrylate, diethylene glycol di(meth)acrylate, tetraethylene glycol di(meth)acrylate, tripropylene glycol di(meth)acrylate, neopentyl glycol di(meth)acrylate, 1,4-butanediol di(meth)acrylate, poly(butanediol) di(meth)acrylate, tetraethylene glycol di(meth)acrylate, 1,3-butylene glycol di(meth)acrylate, triethylene glycol di(meth)acrylate, triisopropylene glycol di(meth)acrylate, polyethylene glycol di(meth)acrylate, bisphenol A di(meth)acrylate, and the like; trifunctional (meth)acrylate monomers such as trimethylol propane tri(meth)acrylate, pentaerythritol monohydroxy trimethyl acrylate, trimethylol propane triethoxy(meth)acrylate, and the like; tetrafunctional (meth)acrylate monomers such as pentaerythritol tetra(meth)acrylate, ditrimethylol propane tetra (meth)acrylate, and the like; and pentafunctional (meth) acrylate monomers such as dipentaerythritol (monohydroxy) pentamethacrylate, and the like.

In one embodiment, the amount of polyfunctional (meth)acrylate monomer in the monomer component is from about 0.01 to about 5 mass parts for 100 mass parts of monofunctional (meth)acrylate monomer. With this amount, the effect of increasing the strength of the heat conductive sheet 10 by a cross-linked structure can be sufficiently achieved, reduction in flexibility due to excessive cross-linking can be avoided, and a heat conductive sheet 10 with high flexibility can be obtained.

Polymerization of the monomer component can be performed by a variety of methods as described below, such as thermal polymerization, ultraviolet light polymerization, electron beam polymerization, gamma beam irradiation polymerization, ionizing beam irradiation polymerization, and the like.

In one embodiment, the amount of (meth)acrylate polymer in the heat conductive sheet 10 is about 0.05 to about 30 mass %, particularly about 0.5 to about 15 mass %, based on a total weight of the heat conductive sheet 10.

Trimellitate Ester Plasticizer

The trimellitate ester plasticizer is a compound obtained by using a trimellitate ester as a plasticizer, and in one embodiment is a compound expressed by the following formula (1).

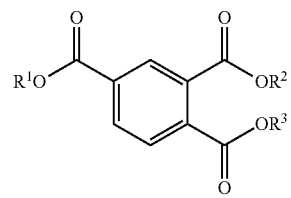

(1)

In the formula, $R^1$, $R^2$, and $R^3$ individually represent alkyl groups with 1 to 24 carbon atoms. The alkyl group can be straight chained, branched, or cyclic.

If the trimellitate ester plasticizer is a compound expressed by formula (1), the heat conductivity and flexibility can be maintained in high temperature environments for an even longer period of time.

$R^1$, $R^2$ and $R^3$ can be same or different groups, but being a same group is preferable from the perspective of ease of procurement.

In one embodiment, $R^1$, $R^2$ and $R^3$ are alkyl groups with 1 to 24 carbon atoms, particularly alkyl groups with 4 to 18 carbon atoms. With a trimellitate ester plasticizer having these alkyl groups, vaporization of the plasticizer and bleed out of the antioxidant are further suppressed, and the long-term stability of the heat conductivity sheet 10 in high temperature environments will be further enhanced.

In one embodiment, the alkyl groups of $R^1$, $R^2$, and $R^3$ are straight chain or branched.

Examples of the trimellitate ester plasticizer include, but are not limited to: tri-n-hexyl trimellitate, tri-n-octyl trimellitate, tri-2-ethylhexyl trimellitate, tri-n-nonyl trimellitate, tri-isononyl trimellitate, tri-n-decyl trimellitate, tri-isodecyl trimellitate, trilauryl trimellitate, trimyristyl trimellitate, tristearyl trimellitate, tri-isostearyl trimellitate, and the like.

In one embodiment, the amount of trimellitate ester plasticizer in the heat conductive sheet 10 is from about 30 to about 200 mass parts, particularly about 50 to about 150 mass parts, for 100 mass parts of (meth)acrylate polymer.

First Antioxidant

The first antioxidant is an antioxidant with a hindered phenol backbone and provides heat resistant stability to the heat conductive sheet 10. With the heat conductive sheet 10, bleedout of the first antioxidant is suppressed by joint use of a trimellitate ester plasticizer and the second antioxidant, and therefore the heat resistant stability effect of the first antioxidant can be maintained for a long period of time even if stored in a high temperature environment.

The first antioxidant can have a backbone expressed by the following formula (3) as the hindered phenol backbone. In formula (3), "t-Bu" represents a tert-butyl group.

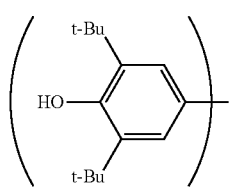

(3)

Examples of the antioxidant having a backbone expressed by formula (3) include, but are not limited to: pentaerythritol tetrakis(3-(3,5-di-tert-futile-4-hydroxyphenyl)propionate), octadecyl-3-(3,5-di-tert-butyl-4-hydroxyphenyl)propionate, and the like.

In one embodiment, the amount of the first antioxidant in the heat conductive sheet 10 is from about 0.1 to about 10 mass parts, particularly about 0.2 to about 8 mass parts, for 100 mass parts of trimellitate ester plasticizer. If the amount of the first antioxidant is within this range, a more favorable heat resistant stability will be achieved, and bleed out of the first antioxidant can be further suppressed.

Second Antioxidant

The second antioxidant is an antioxidant with a thioether backbone. The second antioxidant suppresses vaporizing of the plasticizer and bleedout of the antioxidant when used for long periods of time in high temperature environments, when used in combination with the trimellitate ester plasticizer, and provides the heat conductive sheet 10 with long-term stability in high-temperature environments.

The second antioxidant is preferably a compound expressed by the following formula (2).

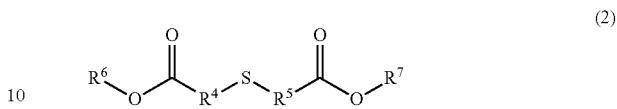

(2)

In the formula, $R^4$ and $R^5$ independently represent alkanediyl groups with 1 to 8 carbon atoms and $R^6$ and $R^7$ independently represent alkyl groups with 2 to 40 carbon atoms. The alkyl group can be a straight chain, branched, or cyclic group. Furthermore, the alkanediyl group is a group where two hydrogen atoms are removed from a straight chain, branched, or cyclic alkane.

$R^4$ and $R^5$ can be same or different groups, and $R^6$ and $R^7$ can be same or different groups, but from the perspective of ease of procurement, $R^4$ and $R^5$ are preferably a same group, and $R^6$ and $R^7$ are preferably a same group.

In one embodiment, the number of carbon atoms in the alkanediyl groups represented by $R^4$ and $R^5$ is from 1 to 8, particularly from 2 to 6. Furthermore, in one embodiment, the alkanediyl groups represented by $R^4$ and $R^5$ are straight chain or branched, particularly straight chain.

In one embodiment, the number of carbon atoms in the alkyl groups represented by $R^6$ and $R^7$ is from 4 to 24, particularly from 12 to 18. Furthermore, the alkyl groups represented by $R^6$ and $R^7$ can be straight chain or branched.

Examples of the second antioxidant include, but are not limited to: ditridecylthiodipropionate, distearylthiodipropionate, dilaurylthiodipropionate, dimirystylthiodipropionate, and the like.

In one embodiment, the amount of the second antioxidant in the heat conductive sheet 10 is from about 0.1 to about 10 mass parts, particularly about 0.2 to about 9 mass parts, for 100 mass parts of trimellitate ester plasticizer. If the amount of the second antioxidant is within this range, the effects of the present invention can be even more pronounced.

Heat Conductive Filler

The heat conductive filler is a component that provides substantial heat conductivity to the heat conductive sheet 10. The heat conductive filler is not particularly restricted, and any commonly known heat conductive filler can be used.

Examples of the heat conductive filler include, but are not limited to: metal hydrate compounds, metal oxides, metal nitrides, and metal carbides.

The metal hydrate compound can be, for example: aluminum hydroxide, magnesium hydroxide, barium hydroxide, calcium hydroxide, dosonite, hydrotalcite, zinc borate, calcium aluminate, zirconium oxide hydrate, and the like. The metal oxide can be, for example: aluminum oxide, magnesium oxide, beryllium oxide, titanium oxide, zirconium oxide, zinc oxide, and the like. The metal nitride can be, for example: boron nitride, aluminum nitride, silicon nitride, and the like. The metal carbide can be, for example: boron carbide, aluminum carbide, silicon carbide, and the like.

The heat conductive fillers are normally added as a powder. An amount of heat conductive filler added (filler content) can be increased by using a combination of a relatively large particle diameter group with an average particle diameter of about 5 to about 50 μm and a relatively small particle diameter group with an average particle diameter of less than about 5 μm. The average particle diameter indicates a particle diameter at a 50% integration value of a particle size distribution determined by a laser diffraction scattering method.

The heat conductive filler can be surface treated using a surface treatment agent such as a silane coupling agent, titanate coupling agent, fatty acid, or the like. By using a heat conductive filler that has been surface treated in this manner, the strength (such as tensile strength) of the heat conductive sheet 10 can be enhanced. Furthermore, the surface treatment has the effect of reducing a viscosity of the heat conductive composition in the manufacturing method of the heat conductive sheet 10 described below. Surface treatment using a titanate coupling agent in particular is preferable from a manufacturing process perspective because the effect of reducing the viscosity of the heat conductive composition will be large. The heat conductive filler can be surface treated beforehand, but the effect of the surface treatment can also be obtained by adding a coupling agent or a surface treatment agent together with the heat conductive filler to the heat conductive composition.

In one embodiment, the amount of heat conductive filler in the heat conductive sheet 10 is about 55 to about 95 volume %, particularly about 65 to about 85 volume %, based on a total amount of the heat conductive sheet 10. If the amount of heat conductive filler is within this range, sufficient heat conductivity can be achieved, and problems with the amount of heat conductive filler being too high such that the heat conductive sheet 10 becomes brittle and manufacturing is difficult can be prevented. Furthermore, a heat conductive sheet with sufficient strength and flexibility can easily be obtained.

Other Components

The heat conductive sheet 10 can also contain components other than those described above. For example, the heat conductive sheet 10 can contain additives such as tackifiers, plasticizers, flame retardants, auxiliary flame retardants, settling agents, thickeners, thixotropic agents such as ultrafine powdered silica and the like, surfactants, antifoaming agents, colorants, conductive particles, antistatic agents, metal deactivating agents, and the like. These additives can be used individually, or in combinations of two or more.

Next, a preferable manufacturing method of the heat conductive sheet 10 is described. The heat conductive sheet 10 can be manufactured in accordance with methods disclosed in previously published documents such as Japanese unexamined patent applications H11-292998, H10-316953, H10-330575, and the like.

Specifically, the heat conductive sheet can be obtained by making a heat conductive composition by degassing and mixing a resin composition containing the monomer component, a trimellitate ester elasticizer, a first antioxidant, a second antioxidant, and a heat conductive filler in a planetary mixer, forming the heat conductive composition in the form of a sheet, and polymerizing.

As described above, polymerization can be performed by a variety of methods, such as thermal polymerization, ultraviolet light polymerization, electron beam polymerization, gamma beam irradiation polymerization, ionizing beam irradiation polymerization, and the like.

Thermal polymerization can be performed by adding an appropriate amount of thermal polymerization initiator to the thermal conductive composition, forming a sheet, and then heating to a temperature of about 50 to about 200° C. Furthermore, ultraviolet light polymerization can be performed by adding an appropriate amount of photopolymerization initiator to the thermal conductive composition, forming a sheet, and then irradiating with ultraviolet light. When polymerizing using a particle energy beam such as with electron beam polymerization, normally a polymerization initiator is not needed.

The thermal polymerization initiator can be, for example, an organic peroxide such as a diacyl peroxide, peroxyketal, ketone peroxide, hydroperoxide, dialkyl peroxide, peroxy ester, peroxy dicarbonate, and the like. More specific examples include, but are not limited to: lauroyl peroxide, benzoyl peroxide, cyclohexanone peroxide, 1,1-bis(t-butylperoxy)-3,3,5-trimethylol cyclohexane, t-butyl hydroperoxide, and the like.

Examples of the photopolymer initiator include, but are not limited to: benzoin ethers such as benzoin ethyl ether, benzoin isopropyl ether, and the like; substituted acetophenones such as anisoin ethyl ether, anisoin isopropyl ether, Michler's ketone (4,4'-tetramethyl diamino benzophenone), 2,2-dimethoxy-2-phenyl acetophenone (for example, product name: KB-1 (product of Sartomer), product name: Irgacure 651 (product of CIBA Specialty Chemicals)), 2,2-diethoxy acetophenone, and the like; substituted alphaketols such as 2-methyl-2-hydroxypropiophenone and the like; aromatic sulfonyl chlorides such as 2-naphthalene sulfonyl chloride and the like; photoactive oxime compounds such as 1-phenone-1,1-propandione-2-(o-ethoxy carbonyl)oxime and the like; and acyl phosphine oxide compounds such as bis(2,4,6-trimethylol benzoyl)-phenyl phosphine oxide, bis(2,6-dimethoxy benzoyl)-2,4,4-trimethylol-phenyl phosphine oxide, 2,4,6-trimethylol benzoyl-diphenyl-phosphinoxide, and the like.

In one embodiment, the aforementioned thermal polymerization initiators and photopolymerization initiators can be arbitrarily combined. An amount of polymerization initiator added to the heat conductive composition is not particularly restricted, but normally is from about 0.05 to about 2.0 mass parts for 100 mass parts of the monomer component.

The monomer component can be added to the heat conductive composition after first thickening by preliminary polymerization. The preliminary polymerization can be performed until a viscosity is from approximately about 5 to about 10,000 mPa.

A thickness of the heat conductive sheet 10 is not particularly restricted, but is about 0.1 mm or more, from perspectives of actual manufacturability, handling, and the like. The heat conductive sheet 10 can have a plurality of laminated heat conductive sheets manufactured by this method.

The heat conductive sheet 10 can be placed between a heating element such as a semiconductor element installed in an electronic device and a heat dissipating device such as a heat sink or the like, and is suitably used in order to transfer heat therebetween. In particular, the heat conductive sheet 10 has excellent long-term stability in high temperature environments, and therefore can be suitably used in applications that are stored for long period of time in high-temperature environments.

In the above, embodiments of the present invention were explained, but the present invention is not limited to these embodiments.

EXAMPLES

The present invention will be explained in further detail below based on working examples, but the present invention is not limited to the following working examples.

The details and abbreviations for each of the components used in the working examples are described below.
(Meth)Acrylate Monomers
  LA: Lauryl acrylate
  ISTA: Isostearyl acrylate
  HDDA: 1,6-hexanediol diacrylate
Polymerization Initiators
  Irgacure 819: product of BASF, bis(2,4,6-trimethylol benzoyl)-phenyl phosphine oxide
Trimellitate Ester Plasticizer
  TOTM: triisooctyl trimellitate (boiling point 414° C./101.3 kPa)
  TDTM: tri-n-decyl trimellitate (boiling point 430° C./101.3 kPa)
  THTM: tri-n-hexyl trimellitate (boiling point 260° C./101.3 kPa)
First Antioxidant
  Irganox 1010: product of BASF, pentaerythritol tetrakis (3-(3,5-di-tert-butyl-4-hydroxyphenyl)propionate)
  Irganox 1076: product of BASF, octadecyl(3-(3,5-di-tert-butyl-4-hydroxyphenyl)propionate)
Second Antioxidant
  AO503: "Adekastab AO 503" produced by ADEKA Corporation, ditridecylthiodipropionate
  TPL-R: "Sumilizer TPL-R", product of Sumika Chemtex Co., Ltd., dilaurylthiodipropionate
  TPS: "Sumilizer TPS", product of Sumika Chemtex Co., Ltd., distearyldipropionate
Heat Conductive Filler
  Al(OH)$_3$: aluminum hydroxide (average particle diameter 50 μm)
  Al$_2$O$_3$: aluminum oxide (average particle diameter 35 μm)
Coupling Agent
  S151: Titanate coupling agent manufactured by Nippon Soda Co., Ltd.

The details and abbreviations for each of the components used in the comparative examples are described below.
Phosphorus Antioxidant
  Irgafos 168: product of BASF, tris(2,4-di-tert-butylphenyl)phosphate
  Irgafos 38: product of BASF, bis(2,4-bis(1,1-dimethylethyl)-6-methylphenyl)ethyl ester phosphorous acid
Vitamin E Antioxidant
  Irganox E201: product of BASF, 3,4-dihydro 2,5,7,8-tetramethyl-2-(4,8,12-trimethylol tridecyl)-2H-benzopyran-6-ol
Adipate Ester Plasticizer
  DINA: diisononyl adipate (boiling point 227° C./0.67 kPa)
  DIDA: diisodecyl adipate (boiling point 240° C./0.53 kPa)
Phthalate Ester Plasticizer
  DIDP: diisodecyl phthalate (boiling point 420° C./101.3 kPa)
Phosphate Ester Plasticizer
  TPP: triphenyl phosphate (boiling point 370° C./101.3 kPa)

Examples 1-10 and Comparative Examples 1-6

Each of the components shown in Tables 1 through 3 were added to a planetary mixer at the formulation ratios shown in Tables 1 through 3, and then degassed and mixed by kneading for 30 minutes at reduced pressure (0.01 MPa) to obtain a heat conductive composition. The heat conductive components obtained were sandwiched between two polyethylene terephthalate (PET) liners that had been treated with a silicone release agent, and calender molded in a sheet shape. The molded object obtained was polymerized by irradiating with light for 10 minutes at 0.3 mW/cm$^2$ and for 10 minutes at 5 mW/cm$^2$ in order to obtain a heat conductive sheet with a thickness of 1 mm.

TABLE 1

|  |  | Working Example 1 | Working Example 2 | Working Example 3 | Working Example 4 | Working Example 5 |
|---|---|---|---|---|---|---|
| (Meth)acrylate Monomer | LA | 50 | 50 | 50 | 50 | 50 |
|  | ISTA | 50 | 50 | 50 | 50 | 50 |
|  | HDDA | 0.1 | 0.1 | 0.1 | 0.1 | 0.1 |
| Polymerization Initiator | IRGACURE 819 | 0.1 | 0.1 | 0.1 | 0.1 | 0.1 |
| Trimellitate ester plasticizer | TOTM | 80 | — | — | 100 | 100 |
|  | TDTM | — | 80 | — | — | — |
|  | THTM | — | — | 80 | — | — |
| First antioxidant | IRGANOX 1010 | 1 | — | 2 | — | 0.5 |
|  | IRGANOX 1076 | — | 2 | — | 4 | — |
| Second antioxidant | AO 503 | 1 | 2 | 5 | 0.5 | 4 |
|  | TPL-R | — | — | — | — | — |
|  | TPS | — | — | — | — | — |
| Heat conductive filler | Al(OH)$_3$ | 700 | 700 | 700 | 700 | 950 |
|  | Al$_2$O$_3$ | 1200 | 1200 | 300 | 300 | — |
| Coupling agent | S151 | 3 | 3 | 3 | 3 | 3 |

TABLE 2

|  |  | Working example 6 | Working example 7 | Working example 8 | Working example 9 | Working example 10 |
|---|---|---|---|---|---|---|
| (Meth)acrylate Monomer | LA | 50 | 50 | 50 | 50 | 50 |
|  | ISTA | 50 | 50 | 50 | 50 | 50 |
|  | HDDA | 0.1 | 0.1 | 0.1 | 0.1 | 0.1 |
| Polymerization Initiator | IRGACURE819 | 0.1 | 0.1 | 0.1 | 0.1 | 0.1 |
| Trimellitate ester | TOTM | — | 100 | — | 50 | — |
|  | TDTM | — | — | 100 | 50 | 70 |

TABLE 2-continued

|  |  | Working example 6 | Working example 7 | Working example 8 | Working example 9 | Working example 10 |
|---|---|---|---|---|---|---|
| plasticizer | THTM | 80 | — | — | — | 50 |
| First antioxidant | IRGANOX1010 | 6 | 1.5 | 1.5 | 1.5 | 1.5 |
|  | IRGANOX1076 | — | — | — | — | — |
| Second antioxidant | AO503 | 6 | — | — | — | 2 |
|  | TPL-R | — | 1 | — | — | — |
|  | TPS | — | — | 3 | 1.5 | — |
| Heat conductive filler | Al(OH)$_3$ | 950 | 700 | 800 | 600 | 700 |
|  | Al$_2$O$_3$ | — | 1200 | — | — | 1200 |
| Coupling agent | S151 | 3 | 3 | 3 | 3 | 3 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| (Meth)acrylate Monomer | LA | 50 | 50 | 50 | 50 | 50 | 50 |
|  | ISTA | 50 | 50 | 50 | 50 | 50 | 50 |
|  | HDDA | 0.1 | 0.1 | 0.1 | 0.1 | 0.1 | 0.1 |
| Polymerization Initiator | IRGACURE 819 | 0.1 | 0.1 | 0.1 | 0.1 | 0.1 | 0.1 |
| Plasticizer | TOTM | — | — | 100 | — | — | — |
|  | TDTM | — | — | — | 60 | — | — |
|  | THTM | — | — | — | — | — | — |
|  | DINA | — | — | — | — | 80 | — |
|  | DIDA | — | — | — | — | — | 80 |
|  | DIDP | 100 | — | — | — | — | — |
|  | TPP | — | 100 | — | — | — | — |
| First antioxidant | IRGANOX 1010 | 2 | 2 | 2 | 2 | 1 | 4 |
| Other antioxidants | Irgafos168 | 2 | — | 4 | — | — | — |
|  | Irgafos38 | — | 2 | — | 2 | — | — |
|  | IrganoxE201 | — | — | — | — | 6 | — |
| Heat conductive filler | Al(OH)$_3$ | 700 | 700 | 700 | 700 | 700 | 700 |
|  | Al$_2$O$_3$ | 300 | 300 | 300 | 300 | 300 | 300 |
| Coupling agent | S151 | 3 | 3 | 3 | 3 | 3 | 3 |

Evaluation of Heat Conductive Sheet

Initial heat conductivity, flexibility, and color as well as the heat conductivity, flexibility, and color after thermal stability testing of the heat conductive sheets obtained by the working examples and comparative examples were evaluated by the following methods. The evaluation results are shown in Table 4.

Evaluation of Heat Conductivity 0.01 m×0.01 m test samples (measurement area: $1.0 \times 10^{-4}$ m$^2$, thickness: L (m)) were cut from the heat conductive sheets fabricated in the working examples and comparative examples. These test samples were interposed between a heat generating plate and a cooling plate. 4.8 W of electricity was applied under a fixed load of $7.6 \times 10^4$ N/m$^2$ and maintained for 5 minutes before measuring a temperature difference (K) between the heating plate and the cooling plate. A thermal resistance $R_L$ (K-m$^2$/W) was determined from the following equation.

$$R_L \text{ K-m}^2/\text{W} = \text{Temperature difference (K)} \times \text{measurement area (m}^2\text{)/power (W)}$$

Furthermore, two test samples were laminated to fabricate a lamination sample with a thickness of 2L (m). A thermal resistance R2L (K-m2/W) was determined by a method similar to the method above. A heat conductivity λ (W/(m-K)) was calculated using the following equation from the values of RL and R2L that were obtained.

$$\lambda \text{ (W/(m·K))} = L/(R2L-RL)$$

Next, for a heat stability test, the heat conductive sheets fabricated in the working examples and comparative examples were stored for 2 weeks in an oven at 150° C., and then the temperature was dropped to 25° C. Test samples were fabricated as described above from the heat stability tested heat conductive sheets, and the heat conductivity λ was determined.

Evaluation of Flexibility

Ten heat conductive sheets fabricated in the working examples and comparative examples were laminated to make a sample for measurement. A hardness of the sample was measured under a load of 1 kg using an Asker C hardness meter.

Next, the measurement samples were left for 2 weeks in an oven at 150° C. and then cooled to 25° C. A hardness of the measurement sample after the thermal stability test was measured under a load of 1 kg using an Asker C hardness meter.

Evaluation of Color

An initial color of the heat conductive sheet fabricated in the working examples and comparative examples was evaluated visually. Next, the same heat stability test that was performed to evaluate the heat conductivity was performed, and a color of the heat conductive sheet after the thermal stability test was compared to the initial color in order to visually evaluate a change in color.

TABLE 4

| | Initial | | | After thermal stability test | | |
|---|---|---|---|---|---|---|
| | Thermal conductivity (W/m·K) | Flexibility (Asker C) | Color | Heat conductivity (W/m·K) | Flexibility (Asker C) | Change in color |
| Working Example 1 | 4 | 40 | White | 4 | 40 | None |
| Working Example 2 | 4 | 40 | White | 4 | 40 | None |
| Working Example 3 | 3.5 | 35 | White | 3.5 | 39 | None |
| Working Example 4 | 3.5 | 35 | White | 3.5 | 38 | None |
| Working Example 5 | 3.5 | 35 | White | 3.5 | 38 | None |
| Working Example 6 | 3.5 | 33 | White | 3.5 | 37 | None |
| Working Example 7 | 4 | 37 | White | 4 | 37 | None |
| Working Example 8 | 2.6 | 30 | White | 2.6 | 30 | None |
| Working Example 9 | 2.4 | 25 | White | 2.4 | 25 | None |
| Working Example 10 | 4 | 32 | White | 4 | 32 | None |
| Comparative Example 1 | 3.5 | 35 | White | 3.3 | 51 | Yellowing |
| Comparative Example 2 | 3.5 | 35 | White | 3.3 | 56 | Yellowing |
| Comparative Example 3 | 3.5 | 35 | White | 3.3 | 48 | Yellowing |
| Comparative Example 4 | 3.5 | 45 | White | 3.2 | 57 | Yellowing |
| Comparative Example 5 | 3.5 | 30 | White | 3.1 | 46 | Yellowing |
| Comparative Example 6 | 3.5 | 30 | White | 3 | 48 | Yellowing |

As shown in Table 4, the heat conductive sheet of the working examples had improved plasticizer vaporization and bleedout of the antioxidants, and therefore maintained the initial level of heat conductivity and flexibility even after thermal stability testing and the color remained white without yellowing. On the other hand, the heat conductive sheet of the comparative examples had decreased heat conductivity and flexibility after thermal stability testing, and the color changed to yellow.

Furthermore, comparative examples 1, 2, 5, and 6 used a plasticizer with a boiling point that was equivalent or higher than the trimellitate ester plasticizer of the working examples, but the heat conductivity and flexibility after the thermal stability test were lower. Therefore, it can be seen that vaporization of the plasticizer cannot easily be sufficiently suppressed simply by selecting a plasticizer with a high boiling point.

The invention claimed is:

1. A heat conductive sheet comprising:
    a (meth)acrylate polymer;
    a trimellitate ester plasticizer;
    a first antioxidant with a hindered phenol backbone; and
    a second antioxidant with a thioether backbone.

2. A heat conductive sheet made by polymerizing a resin composition, comprising:
    a (meth)acrylate monomer;
    a polymerization initiator;
    a trimellitate ester plasticizer;
    a first antioxidant with a hindered phenol backbone;
    a second antioxidant with a thioether backbone; and
    a heat conductive filler.

3. The heat conductive sheet according to claim 1, wherein the trimellitate ester plasticizer is a compound expressed by the following formula (1):

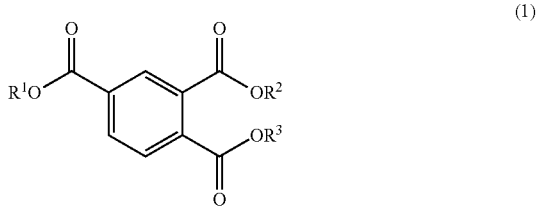

(1)

wherein R1, R2, and R3 individually represent alkyl groups with 1 to 24 carbon atoms.

4. The heat conductive sheet according to claim 1, wherein the second antioxidant is a compound expressed by the following formula (2):

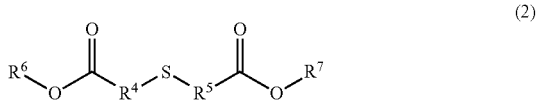

(2)

wherein R4 and R5 individually represent alkandiyl groups with 1 to 8 carbon atoms; and
wherein $R^6$ and $R^7$ individually represent alkyl groups with 2 to 40 carbon atoms.

5. The heat conductive sheet according to claim 1, wherein an amount of the second antioxidant is between about 0.1 and about 10 mass parts for a total of 100 mass parts of the trimellitate ester plasticizer.

6. The heat conductive sheet according to claim 1, wherein an amount of the first antioxidant is between about 0.1 and about 10 mass parts for a total of 100 mass parts of the trimellitate ester plasticizer.

* * * * *

UNITED STATES PATENT AND TRADEMARK OFFICE
CERTIFICATE OF CORRECTION

PATENT NO. : 9,612,065 B2
APPLICATION NO. : 14/114839
DATED : April 4, 2017
INVENTOR(S) : Kentaro Tamura Page 1 of 1

It is certified that error appears in the above-identified patent and that said Letters Patent is hereby corrected as shown below:

Column 6
Line 35, delete "dimirystylthiodipropionate," and insert -- dimyristoylthiodipropionate, --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*